United States Patent Office 2,727,046
Patented Dec. 13, 1955

2,727,046

PURIFICATION OF PHOSPHATIDES

Charles R. Scholfield and Herbert J. Dutton, Peoria, Ill., assignors to the United States of America as represented by the Secretary of Agriculture No Drawing. Application December 17, 1951,
Serial No. 262,163

8 Claims. (Cl. 260—403)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preparation of phosphatides in a refined state. It relates, in particular, to methods for separating carbohydrates from phosphatide mixtures containing the same, thus to provide a more valuable phosphatide product for the various known uses of the phosphatides, as for example, in the field of foods. It relates also to the separation from certain phosphatide products an extract which is rich in valuable carbohydrates.

Crude lecithin, as the term is used in the industry, refers to the heterogeneous mixture of phosphatides, oil, and carbohydrates together with minor amounts of other substances, that is produced by processes for separating and refining oil from oleaginous seed material, such as soybeans, corn germ, cottonseed, peanuts and the like. The crude lecithin is usually separated from the oil during oil refining steps, such as the conventional degumming step. It is a relatively sticky, gummy product which is difficult to handle.

Crude lecithin or "commercial lecithin" may be partially refined by freeing it of its oil content. This may be accomplished by extraction with oil solvents, such as acetone. The oil-free phosphatides so obtained may be fractionated further with ethanol, 95 percent to absolute, to produce an alcohol-soluble fraction and an alcohol-insoluble fraction.

Each of the foregoing substances, i. e., the crude lecithin, the oil-free phosphatides, the alcohol-soluble phosphatides and the alcohol-insoluble phosphatides, contain quantities of sugars. The major portion, i. e., about 85 percent, of the total sugar content in each case is present as free sugar, the remainder being combined chemically, principally with the phosphatides. The presence of sugars in these substances imparts fermentative instability, particularly in the presence of water. Contaminating microorganisms grow in the phosphatides imparting unpleasant odors and tastes and considerably degrading the quality.

Attempts have been made to remove free sugars from phosphatides, such as by water washing and the like. These prior methods, however, have involved the formation of stable emulsions, incomplete separations, and relatively high cost.

We have discovered a class of selective solvents capable of removing the free sugars from phosphatide compositions containing them, by simple extraction methods. These solvents are practically completely selective when employed in accordance with the invention, and moreover, do not involve the formation of troublesome stable emulsions.

Some phosphatides are soluble in alcohol of 95 percent concentration, or higher. These soluble phosphatides, however, become insoluble in alcohol-water mixtures as the proportion of water is progressively increased, until finally, at certain, rather critical proportions, there is minimal solubility of the phosphatides. We have discovered that this minimal solubility of phosphatides in alkanol-water mixtures begins with proportions which vary somewhat, depending upon the particular alcohol used. We have discovered, moreover, that aqueous extractants, although notoriously emulsion-forming with phosphatides, tend to lose that undesirable property when admixed with at least minimum critical proportions of a lower alcohol, such as methanol, ethanol or isopropanol. These limits thus define a range of water-lower alkanol proportions within which phosphatides of the various types hereinbefore discussed may be treated extractively to separate substances, such as sugars.

According to our discoveries, the phenomena which occur when phosphatide material encounters aqueous alkanol solvents are as follows. In the case of anhydrous alkanol, such as methanol, ethanol or isopropanol, the phosphatide dissolves, with the exception of the alcohol-insoluble phosphatides which have been termed in the art "cephalin." As the proportion of water is progressively increased, the solubility of the phosphatides decreases until a value is reached which represents a substantial minimum of about 0.5 percent or less.

In the case of methanol, minimum practical solubility is encountered at a methanol-water concentration of about 75 percent methanol. In the case of ethanol, minimum concentration begins to be realized at about 65 percent. With isopropanol, the value is about 50 percent. As the proportion of water is increased still further, a relatively broad range of alkanol-water ratio occurs, over which minimum amounts of phosphatide are dissolved, and over which stable emulsions do not form. However, as the proportion of water is increased still further, emulsions form which are extremely difficult to resolve. In the case of methanol-water mixtures, the formation of these stable emulsions begins at about 60 percent methanol. With ethanol-water mixtures, stable emulsions begin to form at about 40 percent; while with isopropanol they begin to form at about 30 percent.

It is desirable to operate in the presence of a liquid hydrocarbon solvent for reasons which will be explained subsequently. The hydrocarbon solvent introduces physical phenomena which are superimposed upon, but apparently do not interfere with, the behavior of the phosphatides themselves. For example, with higher concentrations of alcohol, above the values previously mentioned for minimal phosphatide solubility, hydrocarbon solutions of phosphatides are generally miscible with the alcohol. As the proportion of water present increases, however, phase-separation occurs. According to our experience, this separation into two liquid phases occurs at alkanol-water ratios which are higher than the alkanol-water ratios necessary for minimal phosphatide solution.

Utilizing our discoveries, we have developed a method for extracting phosphatide-containing mixtures to remove free sugars that are associated therewith. According to our invention, we extract phosphatide substances with an alkanol-water mixture containing sufficient alcohol to prevent the formation of stable emulsions. The alkanol-water mixture contains also sufficient water to maintain minimal phosphatide solubility.

As previously stated, we prefer to carry out the extraction of the sugars from a solution of the phosphatide material. This preferred method avoids such procedural difficulties as are encountered when a solid material is extracted with a liquid. For instance, liquid-liquid extraction facilitates contact between the extractant and the substance being extracted. The phosphatide material, particularly oil-containing phosphatides, are rather troublesome to handle in an extraction system, since they are, or tend to become, gummy and sticky in character.

It is possible to attain clean separations of the sugar from the phosphatide material, and the extract solutions may be treated in known manner to recover the sugar values. The character and proportion of extracted sugar depends upon the particular phosphatide material extracted. For example, "commercial lecithin" or oil-free "commercial lecithin" results in an extract solution containing a mixture of sucrose, raffinose, and stachyose. The relative proportions of the individual sugars will vary, but, in general, sucrose will be about 45 percent of the total sugars, raffinose about 10 percent, and stachyose about 45 percent. The sugars not extracted consist chiefly of bound mannose, galactose, arabinose and glucose. On the other hand, when the phosphatide material extracted according to our invention consists of the concentrated ethanol-soluble fraction, or the ethanol-insoluble fraction alternatively, the relative proportion of sugars varies considerably. In the first instance, sucrose comprises the major proportion, i. e., about 85 percent of the total sugars. While in the second instance, stachyose constitutes about 80 percent of the total sugars. This shift in the distribution of sugars, it is to be noted, is caused, not by any factor of our extraction method, but rather by the fractionation of the original phosphatides with concentrated ethanol. It should also be noted that the foregoing data are typical of soybean lecithin and the corresponding phosphatide fractions thereof. Other vegetable lecithins will vary in the character and relative proportion of sugar content as is well known in the art.

The following specific examples illustrate the invention with respect to the separation of sugars from soybean phosphatides. It is to be understood, however, that other similar phosphatides may be substituted in our invention, as for example, corn phosphatides, cottonseed or peanut phosphatides, and the like.

*Example 1*

A 50-g. sample of crude oil-containing soybean phosphatides, containing 6.1 percent total sugar, was dissolved in hexane to a total volume of 100 ml. This solution was extracted batchwise with 100 ml. of 55 percent (by volume) ethanol. The phases were separated and the extraction was repeated twice. The hexane solution was then evaporated to dryness and analyzed for sugar content. It contained 2.6 percent sugar. Taking into account the fact that from 12 to 15 percent of the total sugars are usually combined sugars, the extraction represents a substantial separation of the free sugars. The three alcohol extracts were each evaporated to dryness and the residues contained 59 percent, 52 percent, and 9.4 percent sugar, respectively.

*Example 2*

A sample of crude phosphatides, such as those used in Example 1, also containing 6.1 percent total sugar, was extracted with acetone to separate the oil. Approximately 145 g. of the oil-free phosphatides (8.8 percent total sugar) was dissolved in hexane so that the volume of the solution was 575 to 600 ml. This solution was extracted batchwise five times with 500 ml. portions of 55 percent ethanol. The ethanol extracts were combined and evaporated to obtain a residue which comprises 53 percent sugar. The phosphatides, after the hexane had been removed by evaporation, contained 1.6 percent total sugar. Assuming that the total sugar comprises 85 percent free sugar, this shows a 97 percent removal from the phosphatides.

*Example 3*

A 25.4 g. sample of crude phosphatides (same material as used in Example 1) was dissolved in hexane, and the volume of the hexane solution made to 50 ml. A 10-ml. aliquot was shaken with 10 ml. of 75 percent methanol. The residue from the hexane, after evaporation contained 2.7 percent total sugar, and the residue after evaporation of the methanol contained 45.3 percent sugar.

*Example 4*

A 10-ml. aliquot of the same solution used in Example 3 was shaken with 10 ml. of 65 percent methanol. The residue after evaporation of the hexane phase contained 2.2 percent sugar, and the residue after evaporation of the methanol phase contained 43.4 percent sugar.

*Example 5*

A sample of oil-free phosphatides (52.6 g.), containing 7.8 percent total sugar, was dissolved in 155 ml. of hexane. Aliquots (10 ml.) of the phosphatide solution were shaken with various concentrations of alcohols with the following results. A 70-percent methanol solution separated into two layers upon centrifuging; whereas, 50 percent and 30 percent methanol, each gave emulsions which did not break on centrifuging. Solutions of 70 percent and 50 percent ethanol separated into two clear layers on centrifuging; whereas, a solution of 30 percent ethanol gave an emulsion which did not break on centrifuging. A solution of 70 percent isopropanol gave two layers which were almost miscible. Solutions of 50 percent and 30 percent isopropanol separated into two clear layers on centrifuging; whereas, a solution of 20 percent isopropanol gave an emulsion which did not break on standing.

*Example 6*

A 10-ml. aliquot of the solution used in Example 5 was shaken with 10 ml. of 50 percent isopropanol. The residue obtained by evaporating the hexane layer contained 2.7 percent sugar; whereas, the residue from the isopropanol layer contained 62 percent sugar.

We claim:

1. The method comprising extracting a hydrocarbon solution of vegetable phosphatides, said phosphatides containing associated therewith one of the group consisting of sucrose, raffinose and stachyose and mixtures thereof with an alkanol solvent for said sugars, said alkanol solvent being chosen from the group consisting of an aqueous solution of methanol containing 60 to 75 volume percent methanol, an aqueous solution of ethanol containing 40 to 65 volume percent ethanol, and an aqueous solution of isopropanol containing 30 to 50 volume percent isopropanol, and separating the alcoholic extract containing sugars.

2. The method of claim 1 wherein the hydrocarbon is hexane.

3. The method comprising extracting a solution of vegetable phosphatides containing sugars associated therewith dissolved in a hydrocarbon solvent with an aqueous alkanol solution chosen from the group consisting of a solution of water and methanol in which the proportion of methanol and water is within the range of 60 to 75 volume per cent methanol, a solution of water and ethanol in which the proportion of ethanol and water is within the range of 40 to 65 volume percent ethanol, and a solution of water and isopropanol in which the proportion of isopropanol and water is within the range of 30 to 50 volume per cent isopropanol, permitting the two solutions to separate into separate phases, removing the alkanol-water extract and recovering sugars therefrom, and recovering refined phosphatides from the hydrocarbon solution by evaporation.

4. The method comprising dissolving crude oil-containing soybean phosphatides containing associated therewith one of the group consisting of sucrose, raffinose, stachyose, and mixtures thereof in a hydrocarbon solvent, extracting the resulting solution with an aqueous solution of ethanol containing 40 to 65 percent ethanol by volume, separating the aqueous extract from the hydrocarbon solution and recovering extracted sugars from the former and substantially sugar-free phosphatides from the latter.

5. The method comprising extracting a hydrocarbon solution of vegetable phosphatides containing associated therewith one of the group consisting of sucrose, raffinose, and stachyose and mixtures thereof with water and ethanol, the proportion of ethanol and water being within the range of 40 to 65 volume percent ethanol, separating the ethanol-water extract and recovering sugar therefrom.

6. The method comprising extracting a solution of vegetable phosphatides containing sugars associated therewith dissolved in hexane with a solution of water and ethanol, the proportion of ethanol and water of said solution being within the range of 40 to 65 volume percent ethanol, permitting the two solutions to separate into separate phases, removing the ethanol-water extract and recovering sugars therefrom, and recovering refined phosphatides from the hexane solution by evaporation.

7. The method comprising extracting a solution of vegetable phosphatides containing sugars associated therewith dissolved in hexane with a solution of water and isopropanol, the proportion of isopropanol and water of said solution being within the range of 30 to 50 volume percent isopropanol, permitting the two solutions to separate into separate phases, removing the isopropanol-water extract and recovering sugars therefrom, and recovering refined phosphatides from the hexane solution by evaporation.

8. The method comprising extracting a solution of vegetable phosphatides containing sugars associated therewith dissolved in hexane with a solution of water and methanol, the proportion of methanol and water of said solution being within the range of 60 to 75 volume percent methanol, permitting the two solutions to separate into separate phases, removing the methanol-water extract and recovering sugars therefrom, and recovering refined phosphatides from the hexane solution by evaporation.

References Cited in the file of this patent

UNITED STATES PATENTS

| | | |
|---|---|---|
| 2,090,537 | Lund | Aug. 7, 1937 |
| 2,356,382 | Christiansen | Aug. 22, 1944 |
| 2,615,905 | Fortsmann | Oct. 28, 1952 |